United States Patent
Langlotz et al.

(10) Patent No.: US 9,204,040 B2
(45) Date of Patent: Dec. 1, 2015

(54) ONLINE CREATION OF PANORAMIC AUGMENTED REALITY ANNOTATIONS ON MOBILE PLATFORMS

(75) Inventors: Tobias Martin Langlotz, Graz (AT); Daniel Wagner, Vienna (AT); Alessandro Mulloni, Graz (AT); Dieter Schmalstieg, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 841 days.

(21) Appl. No.: 13/112,329

(22) Filed: May 20, 2011

(65) Prior Publication Data

US 2011/0285811 A1    Nov. 24, 2011

Related U.S. Application Data

(60) Provisional application No. 61/347,294, filed on May 21, 2010, provisional application No. 61/349,733, filed on May 28, 2010.

(51) Int. Cl.
*H04N 7/00* (2011.01)
*H04N 5/232* (2006.01)

(52) U.S. Cl.
CPC .................. *H04N 5/23238* (2013.01)

(58) Field of Classification Search
CPC ..... H04N 5/23238; H04N 5/232; G03B 37/04
USPC .................................................... 348/36, 37
See application file for complete search history.

(56) References Cited

U.S. PATENT DOCUMENTS

| | | | |
|---|---|---|---|
| 6,356,297 B1 * | 3/2002 | Cheng et al. | 348/36 |
| 6,563,529 B1 | 5/2003 | Jongerius | |
| 6,657,667 B1 * | 12/2003 | Anderson | 348/333.12 |
| 7,035,760 B2 | 4/2006 | Kobayashi et al. | |
| 7,082,572 B2 | 7/2006 | Pea et al. | |
| 7,126,630 B1 | 10/2006 | Lee et al. | |
| 7,508,977 B2 | 3/2009 | Lyons et al. | |
| 7,522,186 B2 | 4/2009 | Arpa et al. | |
| 7,630,571 B2 | 12/2009 | Cutler et al. | |
| 7,752,008 B2 | 7/2010 | Satoh et al. | |

(Continued)

OTHER PUBLICATIONS

Schmalstieg, et al., "Augmented Reality 2.0" Virtual Realities, Springer Vienna, 2011.

(Continued)

*Primary Examiner* — Jessica M Prince
(74) *Attorney, Agent, or Firm* — Jennifer M Pascua

(57) ABSTRACT

A mobile platform generates a panoramic map by rotating a camera and stores the panoramic map. The mobile platform performs a computer vision operation on the panoramic map while continuing to generate the panoramic map. The mobile platform may determine the location of the camera when the panoramic map is generated, produce an annotation on the panoramic map and transmit the determined location, annotation, and portion to a storage device. In another example, the mobile platform may receive an annotation, a portion of a source panoramic map associated with the annotation, and a location where the source panoramic map was generated. The mobile platform may compare the portion of the source panoramic map to the panoramic map to identify a position on the panoramic map that corresponds to the portion of the source panoramic map, and display the annotation based on the determined position on the panoramic map.

26 Claims, 6 Drawing Sheets

(56) References Cited

U.S. PATENT DOCUMENTS

| | | | |
|---|---|---|---|
| 7,966,563 | B2 | 6/2011 | VanBree |
| 7,999,842 | B1* | 8/2011 | Barrus et al. ............... 348/37 |
| 8,411,091 | B2* | 4/2013 | Horri et al. ............... 345/427 |
| 2001/0010546 | A1 | 8/2001 | Chen |
| 2003/0035047 | A1 | 2/2003 | Katayama et al. |
| 2003/0063133 | A1* | 4/2003 | Foote et al. ............... 345/850 |
| 2003/0091226 | A1* | 5/2003 | Cahill et al. ............... 382/154 |
| 2005/0190972 | A1* | 9/2005 | Thomas et al. ............ 382/218 |
| 2006/0023075 | A1* | 2/2006 | Cutler ....................... 348/218.1 |
| 2007/0025723 | A1* | 2/2007 | Baudisch et al. .......... 396/287 |
| 2007/0109398 | A1 | 5/2007 | Teo |
| 2007/0200926 | A1* | 8/2007 | Chianglin ................. 348/36 |
| 2008/0106594 | A1* | 5/2008 | Thrun ....................... 348/39 |
| 2009/0086022 | A1 | 4/2009 | Finn et al. |
| 2009/0110241 | A1 | 4/2009 | Takemoto et al. |
| 2009/0179895 | A1 | 7/2009 | Zhu et al. |
| 2009/0316951 | A1 | 12/2009 | Soderstrom |
| 2010/0026714 | A1 | 2/2010 | Utagawa |
| 2010/0111429 | A1 | 5/2010 | Wang et al. |
| 2010/0208032 | A1 | 8/2010 | Kweon |
| 2010/0302347 | A1* | 12/2010 | Shikata ..................... 348/36 |
| 2011/0234750 | A1* | 9/2011 | Lai et al. ................... 348/37 |
| 2011/0285810 | A1 | 11/2011 | Wagner et al. |
| 2011/0292166 | A1 | 12/2011 | Schall et al. |

OTHER PUBLICATIONS

Azuma R. et al., "A motion-stabilized outdoor augmented reality system", In Proc. IEEE VR, pp. 252-259, Houston, Texas, USA, 1999.

Azuma R et al., "Tracking in unprepared environments for augmented reality systems", Computer & Graphics, 23(6):787-793, 1999.

Baillot Y. et al., "A tracker alignment framework for augmented reality", In Proc. ISMAR 2003, pp. 142-150, Tokyo, Japan, Oct. 7-10, 2003.

Hoff B. et al., "Autocalibration of an electronic compass in an outdoor augmented reality system", In Proc. ISAR 2000, pp. 159-164, 2000.

Hu X. et al., "Autocalibration of an electronic compass for augmented reality", In Proc. ISMAR 2005), pp. 182-183, Washington, DC, USA, 2005.

Kiyohide Satoh et al.,"A Hybrid Registration Method for Outdoor Augmented Reality,"ISAR, pp. 67, IEEE and ACM International Symposium on Augmented Reality (ISAR'01), 2001.

Reinhold Behringer, "Registration for Outdoor Augmented Reality Applications Using Computer Vision Techniques and Hybrid Sensors," vr, pp. 244, IEEE Virtual Reality Conference 1999 (VR '99), 1999.

Reitmayr G. et al., "Going out: Robust tracking for outdoor augmented reality", In Proc. ISMAR 2006, pp. 109-118, Santa Barbara, CA, USA, Oct. 22-25, 2006.

Reitmayr G. et al.,"Initialisation for visual tracking in urban environments", In Proc. ISMAR 2007, pp. 161-160, Nara, Japan, Nov. 13-16, 2007.

Ribo M. et al., "Hybrid tracking for outdoor augmented reality applications", IEEE Comp. Graph. Appl., 22(6):54-63, 2002.

Schall G. et al., "Global Pose Estimation Using Multi-Sensor Fusion for Outdoor Augmented Reality", In Proc. ISMAR 2009, pp. 153-162, Orlando, Florida, USA, 2009.

Schall, G. et.al., "North-Centred Orientation Tracking on Mobile Phones", Mixed and Augmented Reality (ISMAR), 2010 9th IEEE InternationalSymposium, p. 267, Oct. 13-16, 2010.

Surya You et al., "Orientation Tracking for Outdoor Augmented Reality Registration", IEEE Comput. Graph. Appl. 19, 6 (Nov. 1999), 36-42. DOI=10.1109/38.799738 http://dx.doi.org/10.1109/38.799738.

Thomas B.H et al., "A wearable computer system with augmented reality to support terrestrial navigation", In Proc. ISWC'98, pp. 168-171, Pittsburgh, PA, USA, Oct. 19-20, 1998.

Wagner D., et al., "Real-time panoramic mapping and tracking on mobile phones", Virtual Reality Conference (VR) 2010 IEEE, IEEE, Piscataway, NJ, USA, Mar. 20, 2010, pp. 211-218, XP031656098, ISBN: 978-1-4244-6237-7 the whole document.

You, S. et.al., "Fusion of Vision and Gyro Tracking for Robust Augmented Reality Registration", Virtual Reality, 2001, Proceedings. IEEE Publication pp. 71-78, Mar. 17, 2001.

You.S., et al., "Hybrid inertial and vision tracking for augmented reality registration," In Proc. VR 1999, pp. 260- 267, Houston, Texas, USA, Mar. 13-17, 1999.

Zhang X et al.,"A novel auto-calibration method of the vector magnetometer", In Proc. Electronic Measurement Instruments, ICEMI '09, vol. 1, pp. 145-150, Aug. 2009.

* cited by examiner

ONLINE CREATION OF PANORAMIC AUGMENTED REALITY ANNOTATIONS ON MOBILE PLATFORMS

CROSS-REFERENCE TO PENDING PROVISIONAL APPLICATION

This application claims priority under 35 USC 119 to U.S. Provisional Application No. 61/347,294, filed May 21, 2010, and entitled "Visual Tracking Using Panoramas on Mobile Devices" and to U.S. Provisional Application No. 61/349,733, filed May 28, 2010, and entitled "Online Creation of Panoramic Augmented Reality Annotations on Mobile Platforms" both of which are assigned to the assignee hereof and are incorporated herein by reference.

BACKGROUND

Augmented Reality (AR) may be used to superimpose geo-referenced information in place. Interest in the use of AR has increased because many mobile platforms (e.g., mobile phones, tablets, etc.) are now equipped with a camera, compass and satellite positioning system (SPS), which provide an inexpensive, albeit crude, platform for AR. One difficulty encountered with the use of AR in mobile platforms is that the SPS sensors and compasses provide only limited accuracy and cannot provide precise and accurate pose (position and orientation) information. Moreover, the update rates of the sensors used by mobile phones for AR are in the range of 1 Hz. Accordingly, the AR overlays superimposed on the live video image in the display of current mobile platforms are coarsely placed, e.g., resembling a directional hint rather than an overlay to a particular location.

SUMMARY

A mobile platform generates a panoramic map by rotating a camera and stores the panoramic map. The mobile platform performs a computer vision operation on the panoramic map, while the mobile platform continues to generate the panoramic map. The panoramic map may be generated by tracking rotation from a live video stream from the camera as the camera rotates and incrementally creating the panoramic map using the live video stream and the rotation that is tracked. The computer vision operation may be performed by determining the location of the camera when the panoramic map is generated, producing an annotation on a portion of the panoramic map and transmitting the determined location, annotation, and portion of the panoramic map to a storage device. In another example, computer vision operation is performed by receiving an annotation, a portion of a source panoramic map associated with the annotation, and a location where the source panoramic map was generated. The mobile platform may then compare the portion of the source panoramic map to the panoramic map to identify a position on the panoramic map that corresponds to the portion of the source panoramic map, and display the annotation based on the determined position on the panoramic map.

In one aspect, a method includes generating a panoramic map by rotating a camera; storing the panoramic map; and performing a computer vision operation on the panoramic map while continuing to generate the panoramic map. Generating the panoramic map may include tracking rotation from a live video stream from the camera as the camera rotates; and incrementally creating the panoramic map using the live video stream and the rotation that is tracked. Performing a computer vision operation may include determining a location of the camera when the panoramic map is generated; producing an annotation on a portion of the panoramic map; and transmitting the location, the annotation, and the portion of the panoramic map to a storage device. The computer vision operation may also or alternatively include receiving from a storage device an annotation, a portion of a source panoramic map associated with the annotation, and a location where the source panoramic map was generated; comparing the portion of the source panoramic map to the panoramic map to identify a position on the panoramic map that corresponds to the portion of the source panoramic map; and displaying the annotation based on the position on the panoramic map that is identified as corresponding to the portion of the source panoramic map.

In another aspect, an apparatus includes a camera; a processor connected to the camera to receive images from the camera in a live video stream; memory connected to the processor; a display controlled by the processor; and software held in the memory and run in the processor to cause the processor to generate a panoramic map using the images from the camera as the camera is rotated at a location, store the panoramic map in the memory, and to perform a computer vision operation on the panoramic map in the memory while continuing to generate the panoramic map. The software may cause the processor to generate the panoramic map by tracking rotation from the live video stream as the camera rotates, and to incrementally create the panoramic map using the live video stream and the rotation that is tracked. The software may cause the processor to perform the computer vision operation by determining a location of the camera when the panoramic map is generated, producing an annotation on a portion of the panoramic map, and storing the location, the annotation, and the portion of the panoramic map. The software may additionally or alternatively cause the processor to perform the computer vision operation by causing the processor to retrieve an annotation, a portion of a source panoramic map associated with the annotation, and a location where the source panoramic map was generated, compare the portion of the source panoramic map to the panoramic map to identify a position on the panoramic map that corresponds to the portion of the source panoramic map, and display on the display the annotation based on the position on the panoramic map that is identified as corresponding to the portion of the source panoramic map.

In another aspect, a system includes means for generating a panoramic map using images from a camera a live video stream as the camera rotates; means for storing the panoramic map; and means for performing a computer vision operation on the panoramic map while continuing to generate the panoramic map. The means for generating the panoramic map may include means for tracking rotation from the live video stream as the camera rotates and means for incrementally creating the panoramic map using the live video stream and the rotation that is tracked. The means for performing the computer vision operation may include means for determining a location of the camera when the panoramic map is generated; means for producing an annotation on a portion of the panoramic map; and means for transmitting the location, the annotation, and the portion of the panoramic map to a storage device. The means for performing the computer vision operation may additionally or alternatively include means for receiving from an annotation, a portion of a source panoramic map associated with the annotation, and a location where the source panoramic map was generated; means for comparing the portion of the source panoramic map to the panoramic map to identify a position on the panoramic map that corresponds to the portion of the source panoramic map;

and means for displaying the annotation based on the position on the panoramic map that is identified as corresponding to the portion of the source panoramic map.

In yet another aspect, a computer-readable medium including program code stored thereon includes program code to generate a panoramic map using images from the camera as the camera is rotated at a location; program code to store the panoramic map; and program code to perform a computer vision operation on the panoramic map while continuing to generate the panoramic map. The program code to generate the panoramic map may include program code to track rotation from a live video stream as the camera rotates; and program code to incrementally create the panoramic map using the live video stream and the rotation that is tracked. The program code to perform the computer vision operation may include program code to determine a location of the camera when the panoramic map is generated; program code to produce an annotation on a portion of the panoramic map; and program code to store the location, the annotation, and the portion of the panoramic map. The program code to perform the computer vision operation may additionally or alternatively include program code to retrieve an annotation, a portion of a source panoramic map associated with the annotation, and a location where the source panoramic map was generated; program code to compare the portion of the source panoramic map to the panoramic map to identify a position on the panoramic map that corresponds to the portion of the source panoramic map; and program code to display the annotation based on the position on the panoramic map that is identified as corresponding to the portion of the source panoramic map.

DETAILED DESCRIPTION

Figure 1A:
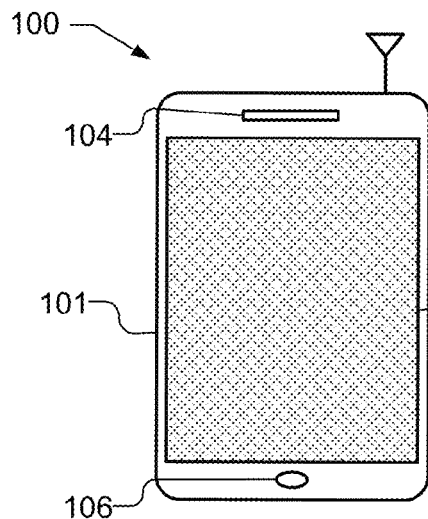
FIGS. 1A and 1B illustrate a front side and back side, respectively, of a mobile platform capable of creating and exploring AR annotations in real time.
Figure 1B:
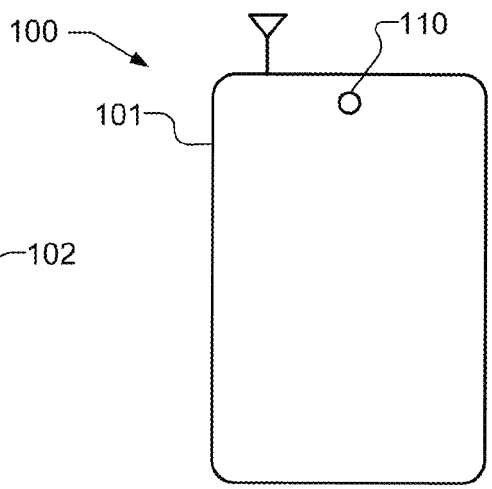

FIGS. 1A and 1B illustrate a front side and back side, respectively, of a mobile platform 100, capable of creating and exploring AR annotations in real time. The mobile platform 100 is illustrated as including a housing 101, a display 102, which may be a touch screen display, as well as a speaker 104 and microphone 106. The mobile platform 100 further includes a camera 110 to image the environment.

As used herein, a mobile platform refers to any portable electronic device such as a cellular or other wireless communication device, personal communication system (PCS) device, personal navigation device (PND), Personal Information Manager (PIM), Personal Digital Assistant (PDA), or other suitable mobile device. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all electronic devices, including wireless communication devices, computers, laptops, tablet computers, etc. which are capable of AR.

Figure 2:
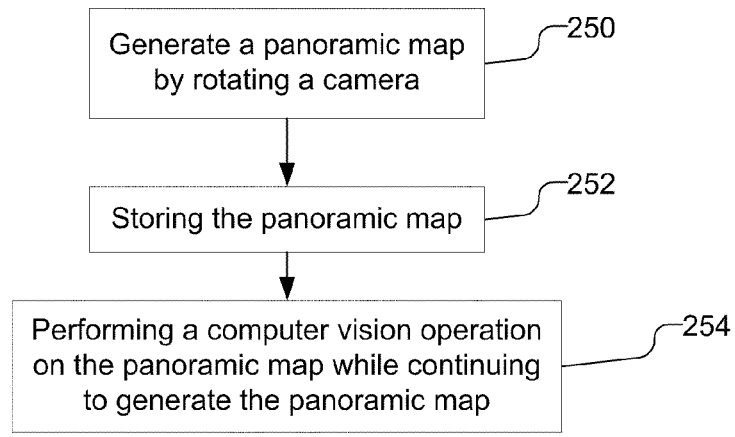
FIG. 2 illustrates the process of performing a computer vision operation on a panoramic map by the mobile platform.

The mobile platform 100 is capable of performing asynchronous processing of a computer vision operation on a panoramic map that is generated by rotating a camera and incrementally creating the panoramic map using a live video stream from the camera 110. FIG. 2 illustrates the process of performing a computer vision operation on a panoramic map by the mobile platform 100. As can be seen, the mobile platform 100 generates a panoramic map by rotating the camera 110 (250). As discussed further below, the panoramic map may be produced by tracking rotation from a live video stream from the camera 110 as the camera rotates. Thus, the tracking is performed as the camera rotates, which provides an uninterrupted AR experience to the user. The panoramic map is incrementally created using the live video stream and the tracked rotation. Thus, as new areas of the environment are seen by the camera, the new areas are added to the panoramic map. The panoramic map is stored (252) and the computer vision operation is performed on the panoramic map (254) while continuing to generate the panoramic map. The computer vision operation is performed on the panoramic map, as opposed to the live video stream, so that the operation may be performed in the background and in parallel with the creation of the panoramic map. Because the computer operation is an asynchronous process, i.e., it is not synchronized with the video rate, high quality processing results may be achieved without having to keep up with the live video feed.

Examples of computer vision operations that may be performed on the panoramic map, include face detection, lighting reconstruction, visual search, horizon detection, contrast enhancement, white balance improvement, as well as other well-known computer vision operations. Another computer vision operations that may be performed on the panoramic map is rotation tracking as discussed below and in U.S. Ser. No. 13/112,876, entitled "Visual Tracking Using Panoramas On Mobile Devices" filed herewith by D. Wagner, A. Mulloni, D. Schmalstieg, and T. Langlotz, and is assigned to the assignee hereof and which is incorporated herein by reference. Another example of computer vision operations that may be performed on the panoramic map is AR annotation creation and detection, as discussed further below.

The mobile platform 100 uses vision-based orientation tracking in combination with SPS data to enable robust and accurate object registration to address problems in AR systems associated with the limited accuracy of SPS system and compass. Vision tracking, however, works with respect to an image database or three-dimensional reconstruction, which must either be predetermined or constructed on the fly. Accordingly, a natural-feature mapping and tracking approach uses a panoramic map created from the live video on the fly and simultaneously tracks from it. The panoramic map is produced assuming pure rotational movements. While using on rotational movement cannot be compared to a full 3D reconstruction of the environment, there are a number of distinct advantages. For example, the application can be operated from any assumed standpoint without having to walk to special designated hotspots. Moreover, using rotational movement corresponds well to the way in which people explore an environment, i.e., by finding an interesting location and then looking around.

Figure 3:
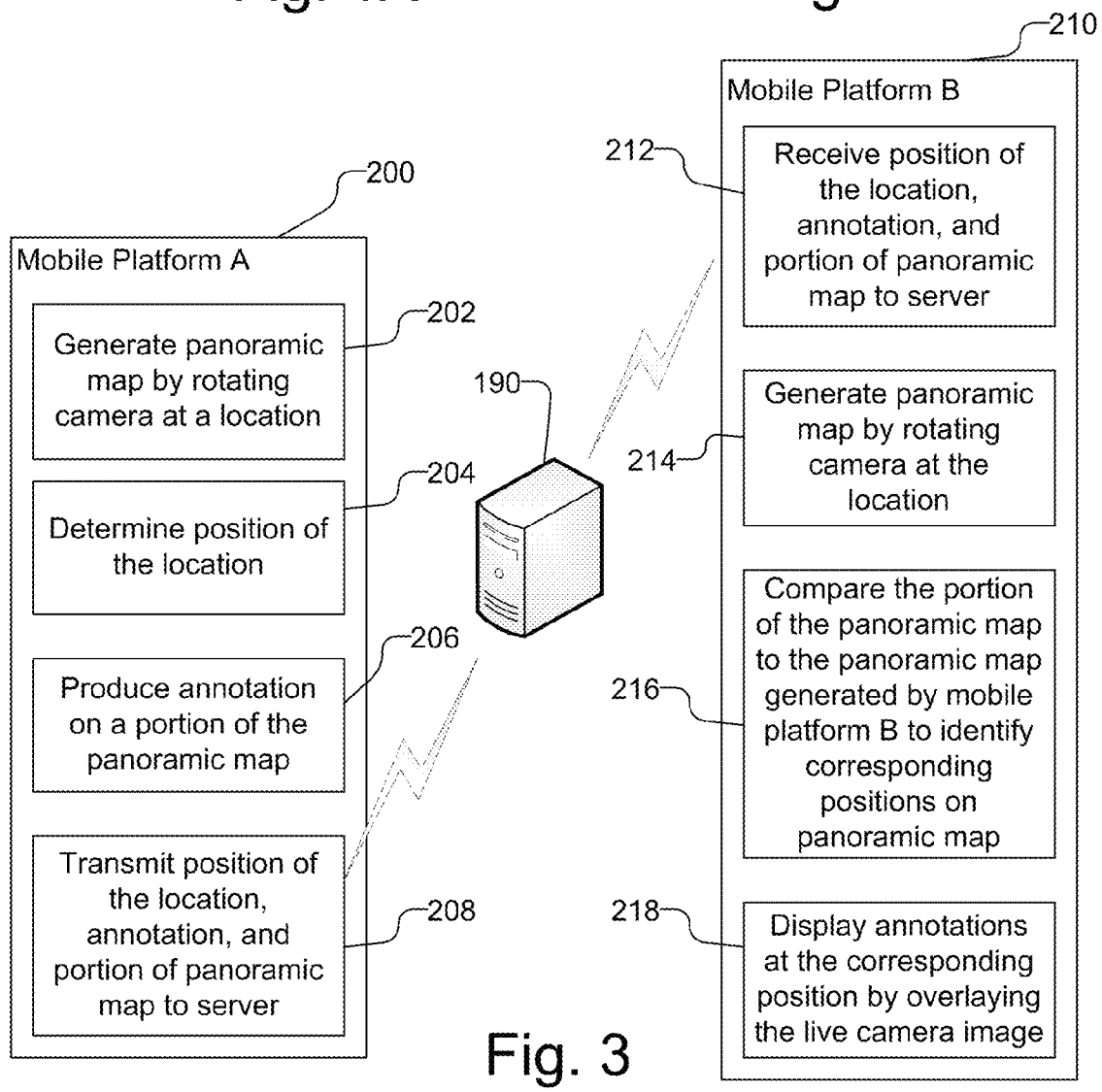
FIG. 3 illustrates an example of creating and exploring AR annotations in real time using mobile platforms.

FIG. 3 illustrates an example of creating and exploring AR annotations in real time using mobile platforms. As illustrated, mobile platform A (200) creates the annotations in process (200), while mobile platform B explores the annotations in process (210). It should be understood, however, that the same mobile platform, e.g., mobile platform A, may both create AR annotations and explore those annotations, e.g., at a later time. Once a user of the first mobile platform A decides to label objects around a current location, the user generates a panoramic map by rotating the camera at the current location (202). The position, e.g., latitude and longitude, of the mobile platform's current location is determined (204) using a SPS or any other appropriate source for determining position including cellular towers or wireless communication access points. An annotation is produced on a portion of the panoramic map (206). The determined position of the location of mobile platforms A, the annotation, and the portion of the panoramic map, i.e., the annotated area of the panoramic map or a description of the visual appearance of the annotated area, are transmitted to an external storage device (208), e.g., server 190.

As illustrated in FIG. 3, using processes 210, a different (or the same) mobile platform B may explore the annotations that mobile platform A produced in process 200. Mobile platform B receives from server 190 the position of the location at which mobile platforms A generated the annotation, as well as the annotation, and the portion of the panoramic map that was annotated (212). For example, when mobile platform B approaches a place where annotations were created, the mobile platform B may access the closest datasets based on the position. Mobile platform B may initially display the environment on an aerial map, which shows current position of the mobile platform B and highlights nearby annotations. The user can employ the map to navigate the environment and to find annotated spots. The user of mobile platform B may be notified when close to the annotated location based on SPS information determined by the mobile platform B. Once the mobile platform B is close to the position with annotations, the annotation data may be downloaded from the server 190. All annotations in immediate proximity, e.g., 50 m, as indicated by their SPS tags, are considered, so that inaccuracies in the SPS data do not affect the experience. If the user decides to browse the annotations, the mobile platform B can be switched to a first-person view showing the current camera image. When in the first-person view, the system may be used for panoramic mapping and tracking. A panoramic map may then be generated at the annotated location by rotating the camera of mobile platform B (214).

It should be understood that the panoramic map produced by mobile platform B should be generated when at the same location as the annotated location, but some deviation from the precise position is acceptable. The acceptable amount of deviation is dependent on the distance to the objects in the panoramic map, e.g., objects that are far away (e.g., in an outside landscape) will allow greater deviation in positions compared to nearby objects (e.g., in an inside environment). The portion of the panoramic map, which was received by mobile platform B, is compared to the panoramic map generated by mobile platform B to identify a position in the panoramic map that corresponds to the portion of the panoramic map (216). When a successful match is made, the annotation produced by mobile platform A can then be displayed by overlaying the live camera image at the identified corresponding position in the panoramic map (218). Additionally, the preview map shown on the display may be updated to display the position of the annotation in the miniaturized version of the panoramic environment map to assist the user in finding the annotations from the current position. If desired, mobile platform B can produce additional annotations at the same location (or at a new location) and upload the annotations as described above. In this manner, users can use a growing collection of in-situ annotations created by members of a social network.

The panoramic map that is generated in step 202, as well as in step 214, in FIG. 3 may be produced using a process that simultaneous maps and tracks the orientation of the mobile platform using cylindrical panoramic images. The panoramic map is generated as a two-dimensional panorama, which assumes pure rotational movement of the mobile platform. The cylindrical panoramic map of the environment is generated on the fly and the map is simultaneously used to track the orientation of the mobile platform. The method may be used a mobile platform 100 capable of, e.g., approximately 15 ms per frame, and permits interactive applications running at high frame rates (30 Hz).

Our panoramic mapping method assumes that the camera undergoes only rotational motion. Under this constraint, there are no parallax effects and the environment can be mapped onto a closed 2D surface. Although a perfect rotation-only motion is unlikely for a handheld camera, the method can tolerate enough error for casual operation, particularly outdoors, where distances are usually large compared to the translational movements of the mobile phone.

Figure 4:
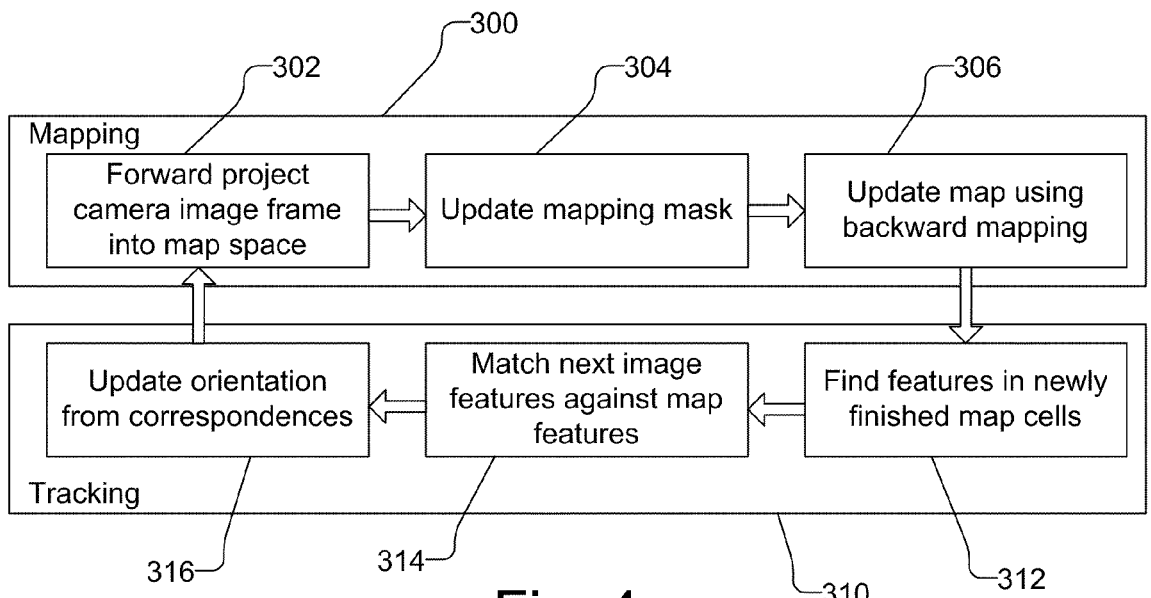
FIG. 4 is a flow chart illustrating the process of real-time panoramic mapping and tracking by mobile platform.

FIG. 4 illustrates a flow chart of the panorama mapping process 300 and the tracking process 310 utilized by mobile platform 100. Tracking requires a map for estimating the orientation, whereas mapping requires an orientation for updating the map. A known starting orientation with a sufficient number of natural features in view may be used to initialize the map. As illustrated, the current camera image frame is forward projected into the panoramic map space (302). A mapping mask is updated (304) and the map is updated using backward mapping (306). Features are found in the newly finished cells of the map (312). The map features are matched against features extracted from the next camera image (314) and based on correspondences, the orientation of the mobile platform is updated (316). Thus, when the mapping process starts, the first camera frame is completely projected into the map and serves as a starting point for tracking. A panoramic cylindrical map is extended by projecting areas of any image frame that correspond to unmapped portions of the panoramic cylindrical map. Thus, each pixel in the panoramic cylindrical map is filled only once.

Figure 5:
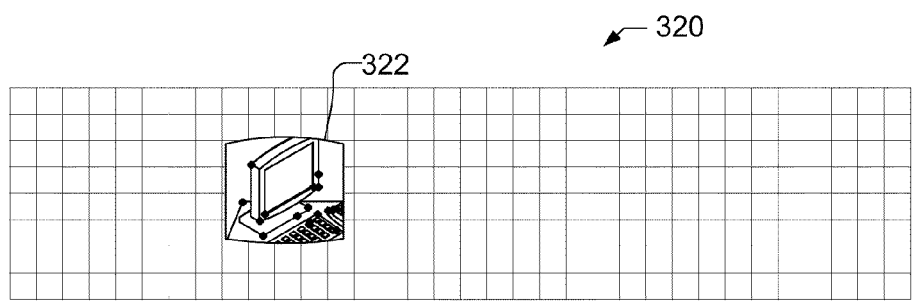
FIG. 5 illustrates an unwrapped cylindrical map that is split into a regular grid of cells and illustrates a first frame projected and filled on the map to generate a panoramic map.

A cylindrical map is used for panoramic mapping as a cylindrical map can be trivially unwrapped to a single texture with a single discontinuity on the left and right borders. FIG. 5, by way of example, illustrates an unwrapped cylindrical map 320 that is split into a regular grid, e.g., of 32×8 cells, and illustrates a first frame 322 projected and filled on the map

320. Every cell in the map 320 has one of two states: either unfinished (empty or partially filled with mapped pixels) or finished (completely filled). When a cell is finished, it may be down-sampled from full resolution to a lower level and keypoints are extracted for tracking purposes. The crosses in the first frame 322 mark keypoints that are extracted from the image.

Figure 6:
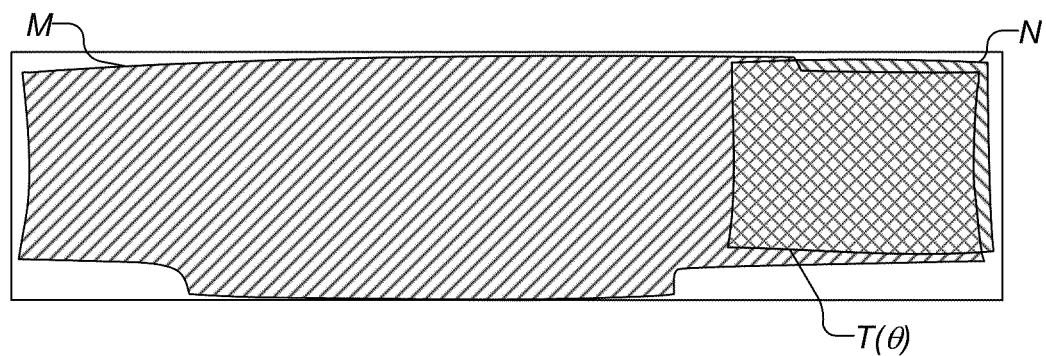
FIG. 6 illustrates a map mask that may be created during the production of a panoramic map.

Pixel-accurate book keeping for the mapping is done using a run length encoded coverage mask. The mapping mask is used to filter out pixels that fall inside the projected camera frame but that have already been mapped. A run-length encoded (RLE) mask may be used to store zero or more spans per row that define which pixels of the row are mapped and which are not. A span is a compact representation that only stores its left and right coordinates. Spans are highly efficient for Boolean operations, which can be quickly executed by simply comparing the left and right coordinates of two spans. FIG. 6, by way of example, illustrates a map mask M that may be created, e.g., during rotation of the mobile platform 100 to the right. The map mask M may be defined for a cylindrical map at its highest resolution. Initially the map mask M is empty. For every frame, the projected camera frame is rasterized into spans creating a temporary mask $T(\theta)$ that describes which pixels can be mapped with the current orientation $\theta$ of the mobile platform 100. The temporary camera mask $T(\theta)$ and the map mask M are combined using a row-wise Boolean operation. The resulting mask N contains locations for only those pixel that are set in the camera mask $T(\theta)$ but are not in the map mask M. Hence, mask N describes those pixels in the map that will be filled by the current image frame. The map mask M is updated to include the new pixels. The use of a map mask, result in every pixel of the map being written only once, and only few (usually <1000) pixels are mapped per frame (after the initial frame is mapped).

The panoramic mapping requires initialization with a reasonable starting orientation for the mobile platform 100, e.g., the roll and pitch of the mobile platform 100 are minimized. For mobile phones with a linear accelerometer, the roll and pitch angles can be automatically determined and accounted for. If the mobile platform 100 contains no additional sensors, the user may start the mapping process while holding the mobile platform with roughly zero pitch and roll.

The mapping process 200 assumes an accurate estimate of the orientation of the mobile platform 100. Once the panoramic map is filled in step 306, the orientation of the mobile platform 100 can be determined using the tracking process 310. As illustrated in FIG. 4, once the panoramic map is filled in step 306, features are found in the newly finished cells in step 312. Keypoints may be extracted from finished cells using the FAST (Features from Accelerated Segment Test) corner detector. Of course, other methods for extracting keypoints may be used, such as Scale Invariant Feature Transform (SIFT), or Speeded-up Robust Features (SURF), or any other desired method. For every keypoint, FAST provides a score of how strong the corner appears.

The keypoints are organized on a cell-level because it is more efficient to extract keypoints in a single run once an area of a certain size is finished. Moreover, extracting keypoints from finished cells avoids problems associated with looking for keypoints close to areas that have not yet been finished, i.e., because each cell is treated as a separate image, the corner detector itself takes care to respect the cell's border. Finally, organizing keypoints by cells provides an efficient method to determine which keypoints to match during tracking.

With the features in the map extracted (step 312 in FIG. 4), the map features are matched against features extracted from the next camera image (step 314). An active-search procedure based on a motion model may be applied to track keypoints from one camera image to the following camera image. Keypoints in the next camera image are extracted and compared against keypoints in the map that were extracted in step 312. Accordingly, unlike other tracking methods, this tracking approach is generally drift-free. However, errors in the mapping process may accumulate so that the map is not 100% accurate. For example, a map that is created with a mobile platform 100 held at an angle is not mapped exactly with the angle in the database. However, once the map is built, tracking is as accurate as the map that has been created.

The motion model provides a rough estimate for the camera orientation in the next camera frame, which is then refined. Based on the estimated orientation, keypoints from the map are projected into the camera image. For all projected keypoints that fall inside the camera view, an 8×8 pixel wide patches is produced by affinely warping the map area around the keypoint using the current orientation matrix. The warped patches represent the support areas for the keypoints as they should appear in the current camera image. The tracker uses Normalized Cross Correlation (NCC) (over a search area) at the expected keypoint locations in the camera image. A coarse-to-fine approach is used to track keypoints over long distances despite a small search area. First, keypoints are matched at quarter resolution, then half resolution and finally full resolution. The matching scores of the NCC are used to fit a 2D quadratic term for sub-pixel accuracy. Since all three degrees of freedom of the camera are respected while warping the patches, the template matching works for arbitrary camera orientations. The correspondences between 3D cylinder coordinates and 2D camera coordinates are used in a non-linear refinement process with the rough orientation estimate as a starting point. Reprojection errors and outliers are dealt with using an M-estimator.

The mapping process may accumulate errors resulting in a map that is not 100% accurate. Accordingly, as a remedy, loop closing techniques may be used to minimize errors that accumulate over a full 360° horizontal rotation. Thus, the map may be extended to cover a horizontal angle larger than 360°, e.g., by an additional angle of 45° (4 columns of cells), which is sufficient for robust loop detection. The loop closing is performed, e.g., when only one column of cells is unfinished in the map. Keypoints are extracted from overlapping regions in the map and a matching process, such as RANSAC (RANdom SAmple Consensus) is performed. A transformation is used to align the matched keypoints in the overlapping regions to minimize the offset between keypoint pairs. For vertical alignment a shear transformation may be applied using as a pivot the cell column farthest away from the gap. Both operations use Lanczos filtered sampling to minimize resampling artifacts.

As long as tracking succeeds, camera frames may be stored at quarter resolution together with their estimated pose. When tracking fails, the current camera image is compared against all stored keyframes and the pose from the best match is used as the coarse guess to re-initialize the tracking process.

Additional information regarding panoramic mapping and tracking is provided in U.S. Ser. No. 13/112,876, entitled "Visual Tracking Using Panoramas On Mobile Devices" filed herewith by D. Wagner, A. Mulloni, D. Schmalstieg, and T. Langlotz, which is assigned to the assignee hereof and which is incorporated herein by reference. If desired, other methods of generating panoramic maps may be used.

Figure 7:
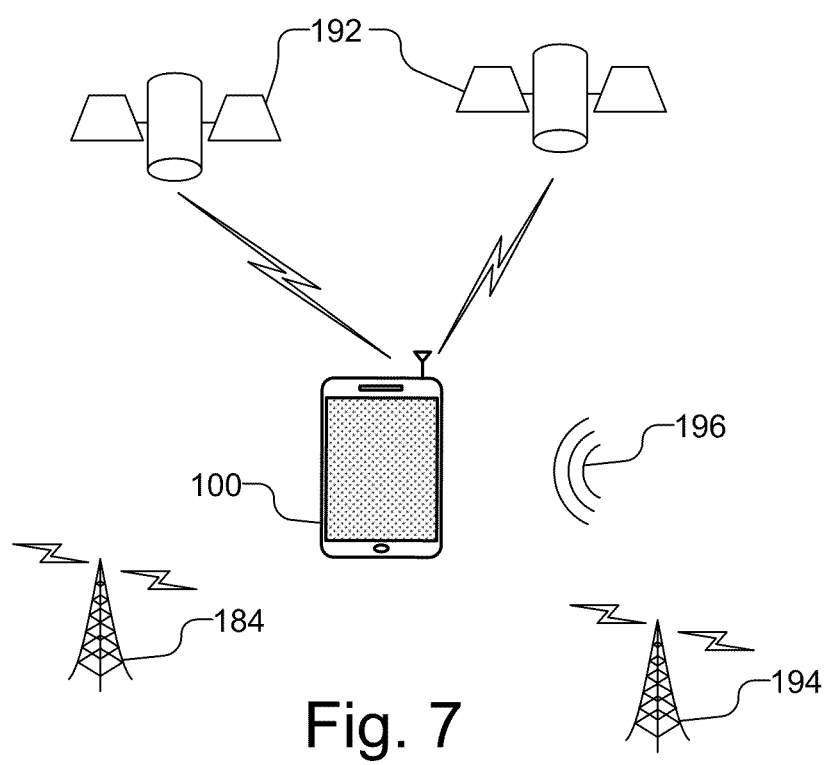
FIG. 7 illustrates the mobile platform which can determine its position using an SPS, which includes satellite vehicles, cellular towers, or wireless communication access points.

The position of the mobile platform may be determined (204 in FIG. 3) using any desired positioning techniques. FIG. 7 illustrates the mobile platform 100 which can determine its position using an SPS, which includes satellite vehicles 192, cellular towers 194, or wireless communication access points 196.

An SPS (satellite positioning system) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs) 192, illustrated in FIG. 7. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). The positioning techniques, however, are not restricted to global systems (e.g., GNSS) for SPS. For example, position determination may be achieved using various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Additionally, the mobile platform 100 is not limited to use with an SPS for position determination, as position determination techniques described herein may be implemented in conjunction with various wireless communication networks, including cellular towers 194 and/or from wireless communication access points 196, such as a wireless wide area network (WWAN), a wireless local area network (WLAN), a wireless personal area network (WPAN), and so on. Further the mobile platform 100 may access online servers to obtain data, such as satellite images, using various wireless communication networks via cellular towers 194 and from wireless communication access points 196, or using satellite vehicles 192 if desired. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Annotations may be produced on a portion of the panoramic map (206 in FIG. 3) using any desired graphical user interface. For example, with the use of a touch screen display 102, the user can create annotations by simply touching the display 102 at the desired position and entering a textual description, a graphical object, or a voice annotation. Where the display 102 is not a touch screen, the user may indicate the desired annotation position using a cursor. The two-dimensional coordinate on the screen is transformed into the corresponding point in the panoramic map. The annotation, e.g., text, graphic, audio clip, is stored along with a portion of the panoramic map centered on the selected position. By way of example, the portion of the panoramic map may be a sub-image, e.g., 48×48 pixels, that is centered on selected position. If desired, an arrangement of multiple sub-images may be used, where the arrangement is centered on the selected position. The sub-image, or sub-images, can be used for template matching and is the only information necessary for finding the annotation anchor point again.

The annotations, e.g., text, graphic, or audio clip, may be provided to an external storage device, such as server 190, along with the position of the mobile platform, and the portion of the panoramic map centered on the selected position in the panoramic map of the annotation (208 in FIG. 3). If desired, additional information may also be provided, such as information related to the originating mobile platform (or its user). Additionally, if the mobile platform 100 includes appropriate motion sensors, such as a compass, the orientation of the annotation, or more specifically, the orientation of the mobile platform 100 when the annotation was selected, may be provided. The orientation may be used to assist in finding the annotation anchor point at a later time.

The server application may be standard Web software and protocols (Apache/Tomcat Servlet, MySQL). The server 190 may also provide a web-based interface for uploading and browsing the annotation data. For better indexing, each annotation is tagged with the current position, e.g., SPS coordinates, and information related to the originating mobile platform (or its user) before uploading the information to the server 190. The position is used to file the submitted annotations according to a spatial index, so that queries for information in the vicinity of a particular standpoint can be executed efficiently. Information on the user's identity, as well as any other desired tags that are provided, may allow efficient filtering of large amounts of annotations.

In previous attempts to produce a system for panoramic mapping and tracking, with annotations, the created map was saved along with the two-dimensional map locations of annotations. Users could then reload the map and explore the annotations. This approach, however, requires the user to be very close to where the map was originally created. With even small deviations in the location, the map may not be registered or the annotations may not be correctly aligned to the correct physical objects. The sensitivity to the location, together with the large memory requirements for storing and transmitting a complete panoramic map, is a major limitation of this previous approach.

The method provided herein for storing, detecting and tracking annotations solves the problems found in previous approaches. The present approach does not rely on previously created maps for tracking, as a new map may be generated on the fly, as described above. Thus, rather than describing the annotations by a position in a previously created map, the annotations are stored in a self-descriptive way suitable for robust re-detection in a newly generated panoramic map.

The position of annotation is may be identified based on template matching, where the one or more templates provided are portions of the panoramic map around the annotations. Thus, the one or more templates are portions of the panoramic map, as opposed to using SIFT or another high-dimensional descriptors to store keypoints surrounding the annotation in the camera image, which is slow and problematic when matching small areas (~50×50 pixels). The one or more templates are not matched against the live camera image but against the newly generated panoramic map. Template matching to a panoramic map is advantageous as the map is always expected to approximately upright and, accordingly, no rotation invariance is required, apart from what the template matching can tolerate (±10°). Moreover, matching the templates against the map allows the searching of regions that have been seen (i.e., mapped), but that are no longer in the view anymore. Thus, the object detection is uncoupled from the current camera view.

Figure 8A:
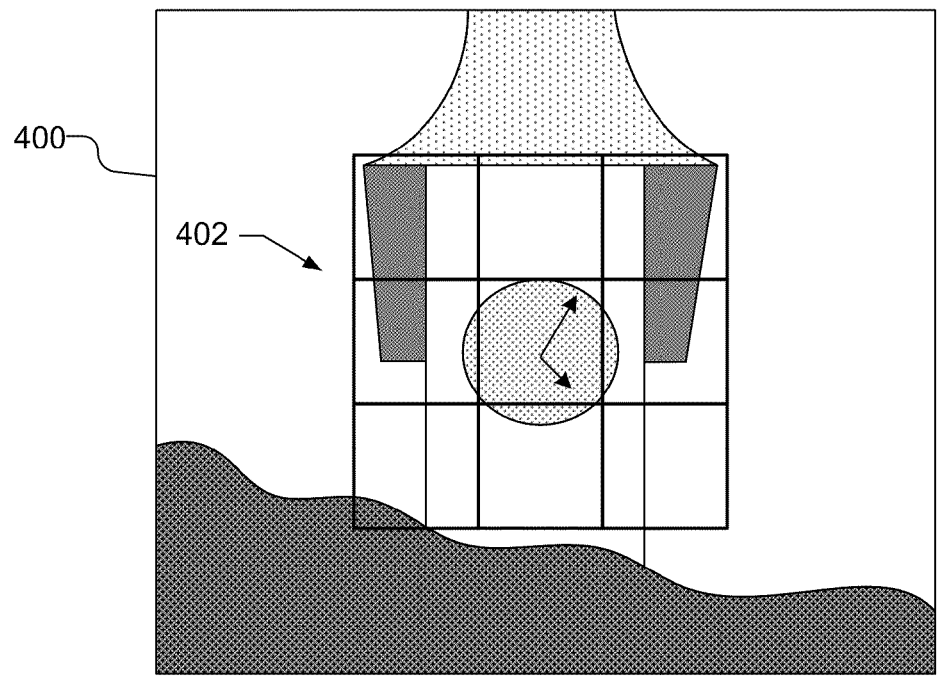
FIGS. 8A and 8B illustrate the comparison of portions of panoramic maps created from slightly different positions.
Figure 8B:
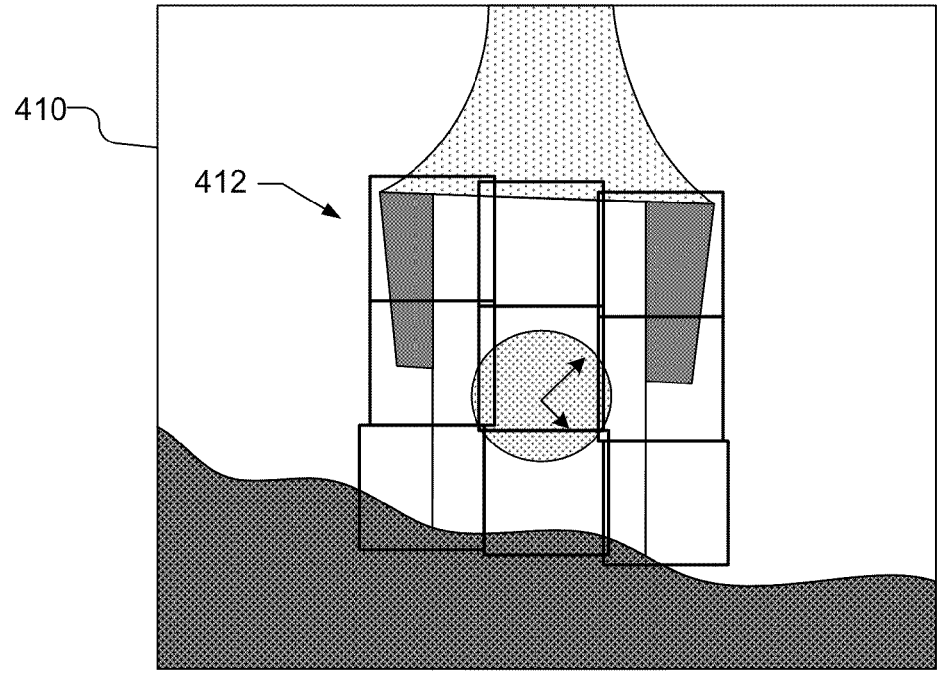

One or more templates may be used to describe a single annotation. By way of example, a single annotation may be described using 9 templates in a 3×3 configuration, where each template has a size of N×N pixels, where N is no more than 32 or no more than 64. By way of example, each template may be 16×16 pixels. It should be understood that, alternative size configurations may be used with additional or fewer templates or larger or smaller templates. The use of small templates, which are fitted to the map independently, makes them more robust to small scale and rotation changes than using one large template. It is not necessary to perfectly reproduce the configuration of templates from the original map. Instead, the templates need only coarsely match the original arrangement with a tolerance of several pixels, e.g., 5 pixels) in any direction, which renders the annotation detection more robust to non-uniform scaling when an object is seen from a slightly different angle. For example, FIG. 8A illustrates a portion 400 of a first map created from a first position showing, with a 3×3 configuration of templates 402. FIG. 8B illustrates a portion 410 of a different map from a slightly different position than the first position. As illustrated in FIG. 8B, the configuration of templates 412 does not perfectly match the arrangement of templates 410 shown in FIG. 8A, but the match may be within tolerance to correctly identify the object in the images.

Compared to a complete map, which requires about 1 megabyte of storage, each annotation may be described with only approximately 2 kilobytes using the 3×3 configuration of templates of 16×16 pixels. Additionally, annotations from multiple users may be combined by loading all annotations that created in a close proximity at step 212 in FIG. 3. Moreover, detecting independent annotations is generally more robust to slight offsets in positions compared to attempting to fit a complete map to a different location.

Figure 9:
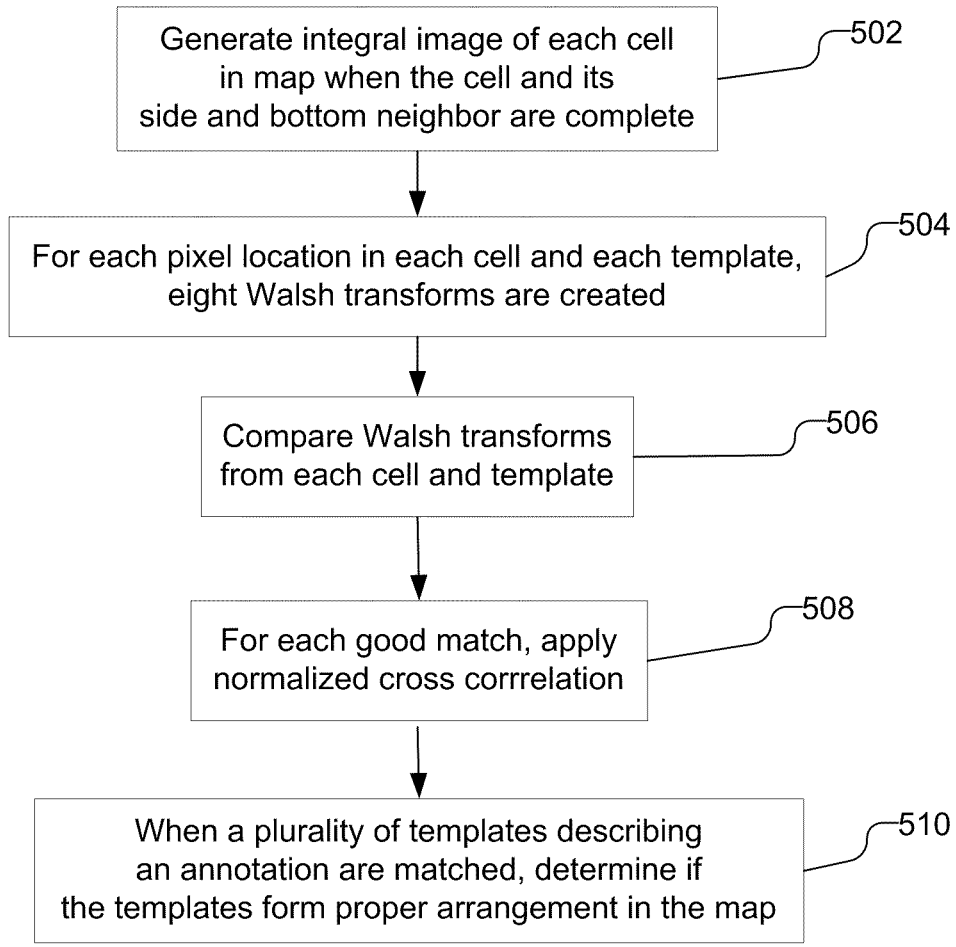
FIG. 9 illustrates a process of template matching using a Walsh transform.

In a typically foreseeable scenario, dozens of annotations, described by hundreds of templates, may be matched against a panoramic map with a size of 2048×512 pixels. Matching such a large number of templates against an image of this size is slow. Accordingly, a Walsh transform may be used in order to provide faster template matching. FIG. 9 illustrates a process of template matching using a Walsh transform. Walsh transforms are very fast to execute, and using integral images renders the execution speed independent of the size of the templates. Additionally, matching multiple templates against the same image scales well, because the same Walsh transform of the image can be matched against an arbitrary number of transformed templates.

As illustrated in FIG. 9, integral images of each cell in the map are generated when the cell and its side and bottom neighbor are completed (502). Producing integral images, as part of the Walsh transform, is memory intensive. Additionally, creating an integral image for the panoramic map, while it is still being updated, would require updating most of the integral image whenever the map is updated. Accordingly, instead of generating an integral image of the entire map, integral images of the 32×8 cells are generated. A cell is only considered for matching with respect to annotation templates once the cell itself as well as its immediate neighbors, e.g., the neighboring cells to the right and the bottom, are completely filled. An integral image for the single cell is generated with sufficient overlap to the right and bottom that the templates can be positioned at every possible pixel location inside that cell. For each pixel location in each cell and in each template, eight Walsh transforms are created (504), which are then compared against the Walsh transforms of the annotations' templates (506).

Matching the eight Walsh transforms, which are eight integer numbers, is not robust to changes in lighting, e.g., brightness offset and contrast change. Maps can be created at different times, and thus may be quite different with respect to lighting. To achieve the desired robustness, the eight Walsh transforms may be normalized, i.e., the 8-vector may be normalized to be zero-mean and have a length of 1. Additionally, to increase the speed of matching, all the normalized vectors may be put into a tree structure Walsh transforms are fast to compute, but only provide a lower bound of the matching error. Accordingly, for each good match, a NCC is also applied as an additional check (508). For each template, the best matching locations, e.g., the ten best, are retained along with their NCC scores. If a plurality of templates, e.g., at least four of the nine templates, have been matched, it is determined whether the form the proper 3×3 arrangement in the map (510), as illustrated in FIGS. 8A and 8B. The use of four out of nine templates provides a good balance between false positives and failed detections. Once it is determined that the templates are in the proper arrangement, the annotation is marked as detected.

The use of templates and the Walsh transform results in an exhaustive search over all possible locations in the map. Most conventional detection methods, on the other hand only search at keypoint locations. Accordingly, the present method is more robust against artifacts such as blur or low texturedness, which can cause keypoint detections to fail. If desired, scale invariance in the present process may be introduced by comparing templates of multiple sizes against the map. However, the use of templates of multiple sizes increases the number of templates to match and has a direct influence on the execution speed.

Because the annotation templates are matched against the generated map, as opposed to the current camera image, a simple scheduling algorithm may be used to ensure a desired application frame rate. Each newly finished cell is not checked immediately, but instead is placed into a queue. During each camera frame, the mobile platform 100 schedules only as much work from the queue as permitted by the given time budget. The operations are simple and their timings are well predictable, accordingly, the workload may be limited so that the time budget is not exceeded.

Accordingly, any mobile platform that is capable of performing real-time panoramic mapping and tracking, may perform the present annotation searching method at a constant speed. On a mobile platform with fast processors, annotations are detected quickly, whereas on mobile platforms with slower processors, detection may take longer. However, because the map is retained in memory, annotations can eventually be detected on any mobile platform. Once all available cells of the map have been searched for annotations, idle computer time may be used to search at different scales for scale invariance until new map cells are finished. Searching at different scales may always be put at the end of the queue.

The rate of re-detection of annotations, e.g., step 216 in FIG. 3, may be improved by enhancing the quality of the panoramic maps so that later matching can tolerate stronger deviations in appearance, as well as using nonvisual sensor measurements to reduce the search area of the vision-based re-detection. Further, a global transformation T may be used to align the source panorama and the target panorama, which will further improve the rate of re-detection of annotations.

The quality of the panoramic map may be enhanced by extending the dynamic range of the panoramic map, which is useful as the template matching of image patches is strongly dependent on the image quality of the panoramic map.

A primary source of problems in the generation of the panoramic map is the automatic adjustment of exposure and white balance of built-in cameras, such as in current generation smartphones. The camera chip performs arbitrary processing to deliver a "nice" image, without letting the application programmer control or even understand the process. While this automatic image processing seems to have no strong effect towards the tracking and therefore does not adversely affect the stitching success, it results in visible boundaries in a resulting panoramic map, where contributions from multiple frames are stitched together. These patches show discontinuities in brightness caused by variations in the exposure settings. Later in the matching, the discontinuities introduce artificial gradients, which heavily affect the template-based matching of the anchor points. The situation is made worse by the fact that discontinuities can appear both, in the image patches describing the annotations, which are extracted from the panoramic map, and in the newly created panoramic map used for re-detecting the annotations.

One solution to suppress such discontinuities caused by exposure changes would be to use a camera that allows the programmer to fix the exposure rate. Such a programmable camera could even provide the possibility to create true high dynamic range images, if the response function could be determined for the integrated camera. However, the number of mobile platforms capable of controlling camera parameters is limited and it is unlikely that fully programmable cameras will become widespread in the foreseeable future.

A different approach that allows the creation of extended dynamic range (EDR) images on mobile platforms, such as smartphones, without any access to the exposure settings may be used. This approach relies on simple estimation, but can compensate for severe artifacts introduced by auto-exposure. For this purpose, during the process of generating the panoramic map, as discussed in relation to FIGS. 4 and 5, the pixel intensities from the first camera frame mapped into the panoramic map are used as a baseline for all further mappings. All subsequent frames are heuristically adjusted to match the intensities found in the first frame, by estimating the overall change of the exposure setting between the first frame and the current frame.

The change of exposure setting between the first frame and the current frame may be estimated using the FAST keypoints, which are computed in the current camera frame and the panoramic map. As these keypoints are already generated for tracking purposes (step 312 in FIG. 4), as discussed above, this step does not generate an additional overhead. The difference of intensities for all pairs of matching keypoints found in the camera frame and in the panoramic map are calculated. The average difference of these point pairs is used to correct the intensities in the current camera frame by adding the difference to each pixel before mapping it into the panorama. This simple correction significantly reduces the discontinuities of intensities. The panoramic map is built using 16 bits per color channel, which was empirically found to be sufficient to avoid any clipping errors when adjusting pixel values in the manner described above, without consuming too much memory bandwidth for a mobile platform. The display of the panoramic map with extended dynamic range is done with a simple linear tone-mapping operator. Using this procedure, discontinuity artifacts are noticeably reduced.

Additionally, the rate of re-detection of annotations may also be improved using non-visual sensor measurements. For example, current generation smartphones and other mobile platforms, include non-visual sensors such as SPS receivers, compasses, accelerometers and even miniature gyroscopes. The accuracy of these sensors is usually inferior to a well-tuned visual tracking system, but non-visual sensors are complementary because of their robust operation. Thus, such non-visual sensors, such as a compass and accelerometers, may be integrated for improved re-detection of annotations. Thus, for example, in step 208 of FIG. 3, non-visual sensor data associated with an annotation is also transmitted to the external storage device, and the second mobile platform B receives the non-visual sensor data in step 212 of FIG. 3.

The improved re-detection is achieved by narrowing down the search area for the vision-based template matching using the information obtained from the internal sensors. Thus, the second mobile platform B in FIG. 3 uses the received non-visual sensor data, as well as its own non-visual sensor data to narrow the search area of the panoramic map in step 216. The region in the panorama where the annotation is likely to be located-based is determined based on a direction estimate from the internal sensors.

By way of example, the panoramic map may be created at a resolution of 2048×512 pixels from 320×240 pixel sized camera images. A typical camera has a field of view of ~60°, so the camera resolution is close to the map resolution: 320 pixels/60°·360°=1920 pixels. The theoretical angular resolution of the map is therefore 360°/2048 pixels=0.176°/pixel. Assuming a maximum error of the compass of ±10°, the annotation may be expected to be found in a window of ±57 pixels around the estimated position. Thus, an area 3 times larger than this window may be considered for re-detection of an annotation, but the NCC score is weighted with a function that penalizes by distance from the active search window. Thus matches outside the primary search area are considered only if they have a very good matching score.

The rate of re-detection of annotations may be further improved using a global transformation T to align the source panorama and the target panorama.

Rather than considering each annotation independently during re-detection, the annotations from a single source may be considered as a set and used to assist in the re-detection of other annotations from that source. Thus, the annotations in the source panorama (the panorama which was used to create the annotations from mobile platform A in FIG. 3) is considered as a set for which a consistent geometric estimate may be achieved. Using the set of annotations from the source panorama, the re-detection of these annotations may be used to produce a global transformation T that maps the set of annotations from the source panorama into the target panorama (representing the current environment) with a minimized average error. Assuming the panoramas are made at the same position, the global transformation T is pure rotation aligning source and target panorama with three degrees of freedom.

Figure 10A:
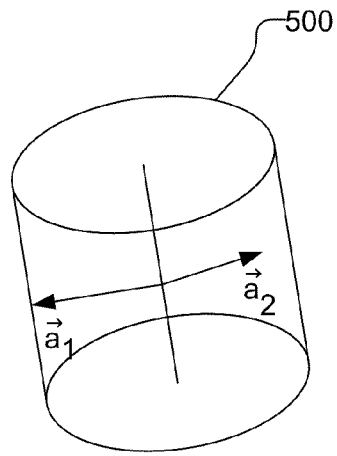
FIG. 10A illustrates a cylindrical source panorama with 3D vectors associated with two annotations.
Figure 10B:
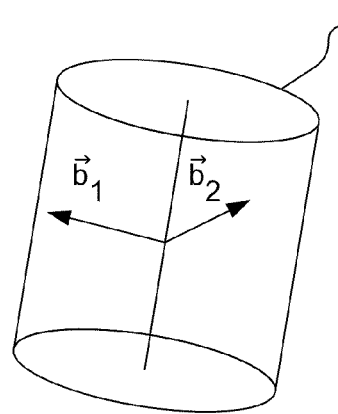
FIG. 10B illustrates a cylindrical target panorama with 3D vectors associated with two annotations.

To compute the transformation T, the position of an anchor point in the source panorama is described by representing anchor coordinates as a 3D vector from the camera position to a point on the cylindrical source panorama 500, as illustrated by vectors $\vec{a}_1$ and $\vec{a}_2$ in FIG. 10A. The 3D vector for each annotation is thus stored along with the image patch and annotation and is transmitted to the external storage device in step 208 of FIG. 3. The dataset for redetection of the annotation, including the 3D vector, is uploaded by the second mobile platform B in step 212 of FIG. 3. After downloading the datasets, the anchor points are redetected using the template-based matching and annotations are initially placed using the best match, as discussed above. Additionally, instead of using only the best match, the best three candidate matches based on NCC score may be stored for later use. For all found candidate matches, the vector-based position in the target panorama is calculated as performed for the original annotations in the source panorama. FIG. 10B, by way of example, illustrates calculated 3D vectors $\vec{b}_1$ and $\vec{b}_2$ for two possible annotations positions in a cylindrical target panorama 502.

Figure 10C:
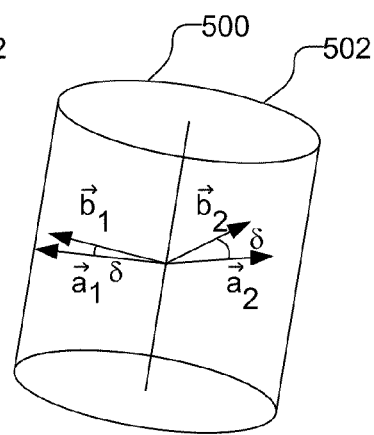
FIG. 10C illustrates the cylindrical source panorama rotated into the cylindrical target panorama.

While online tracking and mapping continues, a RANSAC based approach running in a background thread determines and updates a global rotation T. This rotation aims to optimally map the set of all annotations from the source panorama 500 to the target panorama 502 by aligning the panoramas. For example, two annotations may be selected and one of their three best candidate positions in the target panorama 502 is used as input for finding the best rotation using RANSAC. To find the best match, the rotation T between the two coordinate systems is calculated so that two vector pairs $\vec{a}_1, \vec{a}_2$ and $\vec{b}_1, \vec{a}_2$ can be aligned to each other while minimizing an $L^2$ norm of remaining angular differences. We use the absolute orientation between two sets of vectors to compute this rotation T. The resulting rotation T is the hypothesis for the RANSAC algorithm. All annotations are mapped to the target panorama 502 using the current estimate for T, and the difference of the resulting 2D position in target map space to the annotation position found through template matching is determined If the distance is below a threshold, the annotation is counted as inlier and its error δ is also counted as inlier. Its error δ is then added to an error score. FIG. 10C, by way of example, illustrates the source panorama 500 rotated into the target panorama 502 to align the vector pairs of each panorama using absolute orientation with an error δ, results in a rotation T, which can be used in a RANSAC calculation to determine a model with a sufficiently small error δ.

For a hypothesis with more than 50% inliers, a normalized error score is determined by dividing the raw error score by the number of inliers. The normalized score determines if the new T replaces the previous best hypothesis. This process is repeated until a T with an error score below a certain threshold is found. Such a T is then used to transform all annotations from the source panorama 500 to the target panorama 502. Annotations for which no successful match could be found can now also be displayed at an appropriate position, although with less accuracy because their placement is only determined indirectly.

It is unlikely that the source panorama 500 and the target panorama 502 are never taken from the exact same position, and the resulting systematic error can affect the performance of the robust estimation. It has been empirically determined that a 50% threshold for inliers and a 10 pixel threshold for the normalized error score in 2D map coordinates yields a good compromise between minimizing overall error and reliable performance of the RANSAC approach.

Finding the best rotation to align the source panorama 500 and the target panorama 502 panoramas requires about ~30 ms for 8 annotations. The panoramas, however, are not aligned for each frame, as it is only necessary to update the model once new candidates for annotations anchor points are detected based on the vision-based template matching.

With the anchor points of the annotations re-detected, a continuous precise augmentation of the annotations in the current view can be produced by tracking orientation changes of the mobile platform. As discussed above, re-detection may use measurements from non-visual sensors, such as a compass and accelerometers, to estimate the absolute orientation of the mobile platform because vision-based tracking only estimates orientation with respect to an arbitrary initial reference frame. Additionally, vision-based tracking has difficulties in dealing with fast motion, image blur, occlusion and other visual anomalies. Vision-based tracking, on the other hand, is more accurate than the non-visual sensor-based orientation estimates. Accordingly, the two orientation measurements, i.e., the orientation with respect to an arbitrary initial reference frame from vision based tracking and the orientation with respect to an absolute reference frame from non-visual sensors, may be combined to obtain a robust and accurate orientation.

In principle, the vision-based tracking would be sufficient for accurate orientation estimation, but it only provides relative measurements. Therefore, the sensor-based orientation may be used to estimate the global pose of the initial reference frame of the vision-based tracker and the incremental measurements are applied to this initial and global pose. A first estimate can be obtained through simply reading the sensor-based orientation at the same time the vision based tracker is initialized. However a single measurement of the sensor based orientation will be inaccurate. Therefore, we continuously refine an online estimation of the relative orientation between the initial vision-based tracking frame and the world reference frame. The combination of the visual based tracking relative orientation measurement and the non-visual sensor based absolute orientation measurement is discussed in detail in U.S. Provisional Application No. 61/349,617, filed May 28, 2010, and entitled "North Centered Orientation Tracking In Uninformed Environments" and U.S. application Ser. No. 13/112,268, filed herewith and entitled "North Centered Orientation Tracking In Uninformed Environments", both of which are assigned to the assignee hereof and are incorporated by reference in their entireties.

Figure 11:
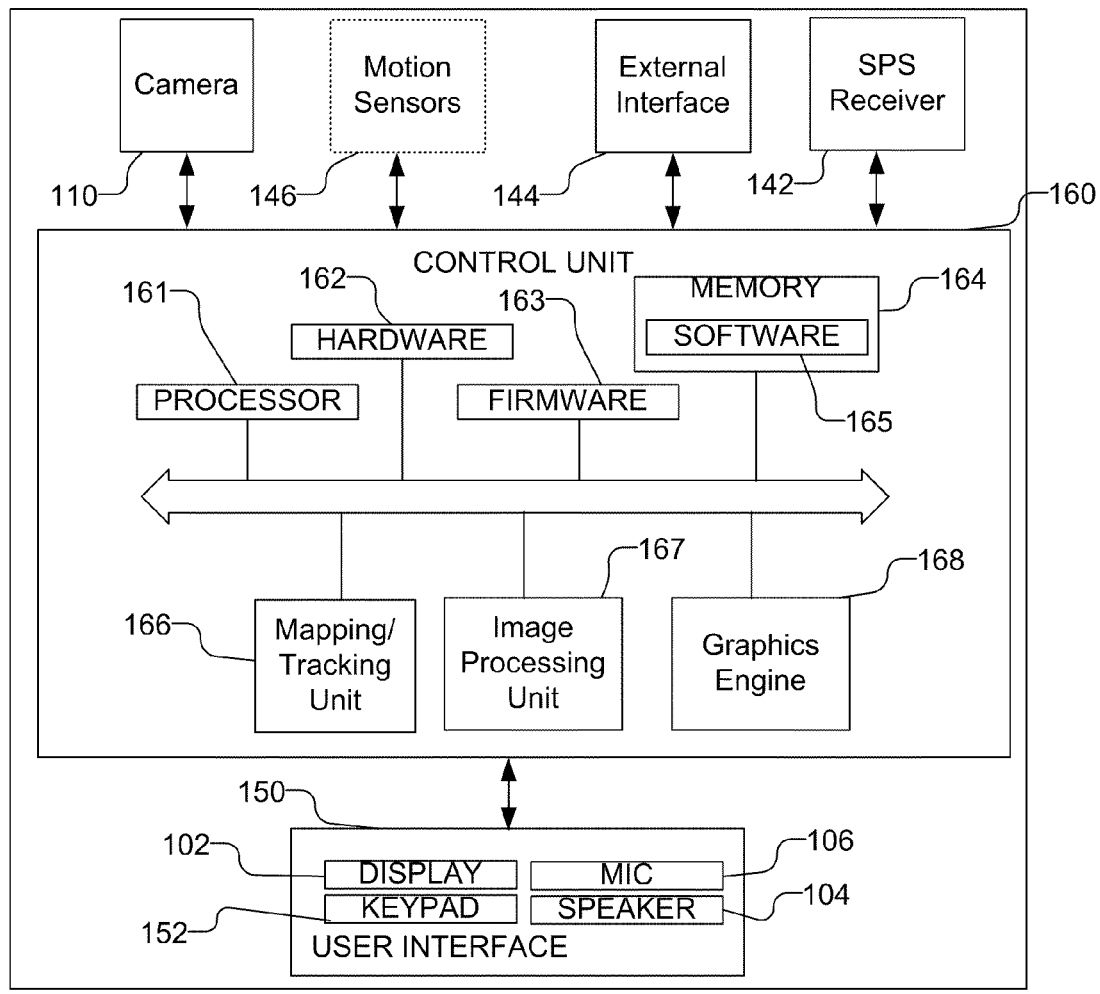
FIG. 11 is a block diagram of a mobile platform capable of creating and exploring AR annotations in real time.

FIG. 11 is a block diagram of a mobile platform 100 capable of asynchronous processing of computer vision operations of a panoramic map and specifically creating and exploring AR annotations in real time. The mobile platform 100 includes the camera 110 as well, an SPS receiver 142 capable of receiving positioning signals from an SPS system, an external interface 144, such as a wireless transceiver, for uploading and downloading annotations as well as receiving positioning data, if desired. The mobile platform may also include motion sensors 146, such as accelerometers, gyroscopes, and/or electronic compass, which may be used to provide positioning data. The mobile platform 100 also includes a user interface 150 that includes the display 102 capable of displaying images captured by the camera 110. The user interface 150 may also include a keypad 152 or other input device through which the user can input information, such as the annotations, into the mobile platform 100. If desired, the keypad 152 may be obviated by integrating a virtual keypad into the display 102 with a touch sensor. The user interface 150 may also include a microphone 106 and speaker 104, e.g., if the mobile platform is a cellular telephone. The microphone 106 may be used to input audio annotations. Of course, mobile platform 100 may include other elements unrelated to the present disclosure.

The mobile platform 100 also includes a control unit 160 that is connected to and communicates with the camera 110, SPS receiver 142, external interface 144, motion sensors 146 (if present) and user interface 150. The control unit 160 accepts and processes data from the camera 110 and user interface 150 and controls the display 102, as well the external interface 144, in response as discussed above. The control unit 160 may be provided by a processor 161 and associated memory 164, hardware 162, software 165, and firmware 163. The mobile platform 100 may include a mapping and tracking unit 166 for processing the images from the camera 110 and producing and tracking the cylindrical panoramic map. The control unit 160 may further include an image processing unit 167, which may be used to match template images downloaded via external interface 144 to a panoramic map produced by the mapping and tracking unit 166, as described above. The control unit 160 may further include a graphics engine 168, which may be, e.g., a gaming engine, to render desired data or text in the display 102 at the annotation anchor point in the current image view in display 102, as described above. The mapping and tracking unit 166, image processing unit 167, and graphics engine 168 are illustrated separately and separate from processor 161 for clarity, but may be a single unit and/or implemented in the processor 161 based on instructions in the software 165 which is run in the processor 161. It will be understood as used herein that the processor 161, as well as one or more of the mapping and tracking unit 166, image processing unit 167, and graphics engine 168 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 162, firmware 163, software 165, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method, comprising:
    generating a panoramic map, at a location, based on a live video stream;
    storing the panoramic map;
    performing a computer vision operation on the panoramic map while continuing to generate the panoramic map, wherein performing the computer vision comprises:
        receiving from a storage device an annotation, a portion of a source panoramic map associated with the annotation, and a source location where the source panoramic map was generated;
        comparing the portion of the source panoramic map to the panoramic map to identify a position on the panoramic map that corresponds to the portion of the source panoramic map, wherein the comparing the portion of the source panoramic map to the panoramic map is performed based on a proximity of the location to the source location; and
        displaying the annotation based on the position on the panoramic map that is identified as corresponding to the portion of the source panoramic map.

2. The method of claim 1, wherein the portion of the source panoramic map is a plurality of adjacent patches from the source panoramic map.

3. The method of claim 2, wherein each of the plurality of adjacent patches comprises NxN pixels, where N is no more than 64.

4. The method of claim 1, wherein comparing the portion of the source panoramic map to the panoramic map comprises comparing the portion of the source panoramic map to completed portions of the panoramic map.

5. The method of claim 4, further comprising placing completed portions of the panoramic map in a queue to be compared to the portion of the source panoramic map based on a limited time budget.

6. The method of claim 4, wherein comparing the portion of the source panoramic map to the panoramic map further comprises:
   generating integral images of each completed portion of the panoramic map;
   creating a Walsh transform for the portion of the source panoramic map and each of the integral images;
   comparing the Walsh transforms for the portion of the source panoramic map and each of the integral images to find good matches; and
   applying a Normalized Cross Correlation computation for the good matches.

7. The method of claim 6, wherein the portion of the source panoramic map is an arrangement of a plurality of adjacent patches from the source panoramic map, wherein creating the Walsh transform, and comparing the Walsh transform is performed for each of the plurality of adjacent patches, the method further comprising determining that a plurality of the good matches are in a same arrangement as the plurality of adjacent patches.

8. An apparatus, comprising:
   a camera;
   a processor connected to the camera to receive images from the camera in a live video stream;
   memory connected to the processor;
   a display controlled by the processor;
   a satellite positioning system receiver that provides location data to the processor; and
   software held in the memory and run in the processor to cause the processor to generate a panoramic map, at a location, using the images from the camera, store the panoramic map in the memory, and to perform a computer vision operation on the panoramic map in the memory while continuing to generate the panoramic map, wherein the software held in memory and run in the processor to cause the processor to perform the computer vision operation causes the processor to retrieve an annotation, a portion of a source panoramic map associated with the annotation, and a source location where the source panoramic map was generated, compare the portion of the source panoramic map to the panoramic map to identify a position on the panoramic map that corresponds to the portion of the source panoramic map, wherein the compare the portion of the source panoramic map to the panoramic map is performed based on a proximity of the location to the source location, and display on the display the annotation based on the position on the panoramic map that is identified as corresponding to the portion of the source panoramic map.

9. The apparatus of claim 8, wherein the portion of the source panoramic map is a plurality of adjacent patches from the source panoramic map.

10. The apparatus of claim 9, wherein each of the plurality of adjacent patches comprises NxN pixels, where N is no more than 64.

11. The apparatus of claim 8, wherein the processor compares the portion of the source panoramic map to completed portions of the panoramic map.

12. The apparatus of claim 11, wherein the processor places completed portions of the panoramic map in a queue to be compared to the portion of the source panoramic map based on a limited time budget.

13. The apparatus of claim 11, wherein the software further causes the processor to generate integral images of each completed portion of the panoramic map, create a Walsh transform for the portion of the source panoramic map and each of the integral images, compare the Walsh transforms for the portion of the source panoramic map and each of the integral images to find good matches, and apply a Normalized Cross Correlation computation for the good matches.

14. The apparatus of claim 13, wherein the portion of the source panoramic map is an arrangement of a plurality of adjacent patches from the source panoramic map, wherein the processor creates the Walsh transform, and compares the Walsh transform for each of the plurality of adjacent patches, the processor further determines that a plurality of the good matches are in a same arrangement as the plurality of adjacent patches.

15. A system, comprising:
   means for generating a panoramic map, at a location, using images from a camera;
   means for storing the panoramic map;
   means for performing a computer vision operation on the panoramic map while continuing to generate the panoramic map;
   means for receiving from an annotation, a portion of a source panoramic map associated with the annotation, and a source location where the source panoramic map was generated;
   means for comparing the portion of the source panoramic map to the panoramic map to identify a position on the panoramic map that corresponds to the portion of the source panoramic map, wherein the means for comparing the portion of the source panoramic map to the panoramic map is performed based on a proximity of the location to the source location; and
   means for displaying the annotation based on the position on the panoramic map that is identified as corresponding to the portion of the source panoramic map.

16. The system of claim 15, wherein the portion of the source panoramic map is a plurality of adjacent patches from the source panoramic map.

17. The system of claim 15, wherein the means for comparing the portion of the source panoramic map to the panoramic map comprises means for comparing the portion of the source panoramic map to completed portions of the panoramic map.

18. The system of claim 17, further comprising means for placing completed portions of the panoramic map in a queue to be compared to the portion of the source panoramic map based on a limited time budget.

19. The system of claim 15, wherein the means for comparing the portion of the source panoramic map to the panoramic map further comprises:
   means for generating integral images of each completed portion of the panoramic map;
   means for creating a Walsh transform for the portion of the source panoramic map and each of the integral images;
   means for comparing the Walsh transforms for the portion of the source panoramic map and each of the integral images to find good matches; and
   means for applying a Normalized Cross Correlation computation for the good matches.

20. The system of claim 19, wherein the portion of the source panoramic map is an arrangement of a plurality of adjacent patches from the source panoramic map, wherein the means for comparing the portion of the source panoramic map to the panoramic map creates the Walsh transform and compares the Walsh transform for each of the plurality of adjacent patches, wherein the means for comparing the portion of the source panoramic map to the panoramic map further comprises means for determining that a plurality of the good matches are in a same arrangement as the plurality of adjacent patches.

21. A non-transitory computer-readable medium including program code stored thereon, comprising:
program code to generate a panoramic map, at a location, using images from the camera;
program code to store the panoramic map;
program code to perform a computer vision operation on the panoramic map while continuing to generate the panoramic map;
program code to retrieve an annotation, a portion of a source panoramic map associated with the annotation, and a source location where the source panoramic map was generated;
program code to compare the portion of the source panoramic map to the panoramic map to identify a position on the panoramic map that corresponds to the portion of the source panoramic map, wherein the program code to compare the portion of the source panoramic map to the panoramic map is performed based on a proximity of the location to the source location; and
program code to display the annotation based on the position on the panoramic map that is identified as corresponding to the portion of the source panoramic map.

22. The non-transitory computer-readable medium of claim 21, wherein the portion of the source panoramic map is a plurality of adjacent patches from the source panoramic map.

23. The non-transitory computer-readable medium of claim 21, wherein the program code to compare the portion of the source panoramic map to the panoramic map compares the portion of the source panoramic map to completed portions of the panoramic map.

24. The non-transitory computer-readable medium of claim 23, further comprising program code to place completed portions of the panoramic map in a queue to be compared to the portion of the source panoramic map based on a limited time budget.

25. The non-transitory computer-readable medium of claim 21, wherein the program code to compare the portion of the source panoramic map to the panoramic map further comprises:
program code to generate integral images of each completed portion of the panoramic map,
program code to create a Walsh transform for the portion of the source panoramic map and each of the integral images,
program code to compare the Walsh transforms for the portion of the source panoramic map and each of the integral images to find good matches; and
program code to apply a Normalized Cross Correlation computation for the good matches.

26. The non-transitory computer-readable medium of claim 25, wherein the portion of the source panoramic map is an arrangement of a plurality of adjacent patches from the source panoramic map, further comprising program code to determine that a plurality of the good matches are in a same arrangement as the plurality of adjacent patches.

* * * * *